United States Patent
Connelly

(10) Patent No.: US 7,478,700 B2
(45) Date of Patent: Jan. 20, 2009

(54) RETENTION LINKAGE FOR VEHICLE EXHAUST SYSTEMS

(75) Inventor: William R Connelly, Kirkland, WA (US)

(73) Assignee: PACCAR Inc, Bellevue, WA (US)

( * ) Notice: Subject to any disclaimer, the term of this patent is extended or adjusted under 35 U.S.C. 154(b) by 544 days.

(21) Appl. No.: 11/338,476

(22) Filed: Jan. 24, 2006

(65) Prior Publication Data

US 2007/0169981 A1    Jul. 26, 2007

(51) Int. Cl.
*B60K 13/04* (2006.01)

(52) U.S. Cl. .......................... 180/296; 180/309; 248/59

(58) Field of Classification Search ................ 180/89.2, 180/296, 309; 248/608, 609, 638, 635, 634, 248/201, 58, 59, 60, 62, 587
See application file for complete search history.

(56) References Cited

U.S. PATENT DOCUMENTS

| | | | |
|---|---|---|---|
| 716,192 A | 12/1902 | Collis | |
| 2,439,067 A | 4/1948 | Wood | |
| 3,292,887 A * | 12/1966 | Cassel et al. | 248/60 |
| 4,192,142 A | 3/1980 | Haegele | |
| 4,209,155 A * | 6/1980 | Florian | 248/62 |
| 4,871,181 A * | 10/1989 | Usher et al. | 277/627 |
| 5,197,698 A * | 3/1993 | Bartholomew | 248/60 |
| 5,328,209 A * | 7/1994 | Cromwell | 285/1 |
| 5,649,685 A | 7/1997 | Keller | |
| 5,873,429 A | 2/1999 | Qutub | |
| 6,095,460 A | 8/2000 | Mercer et al. | |
| 7,207,527 B2 * | 4/2007 | Opperthauser | 248/55 |

\* cited by examiner

*Primary Examiner*—Christopher P Ellis
*Assistant Examiner*—John D Walters
(74) *Attorney, Agent, or Firm*—Christensen O'Connor Johnson Kindness PLLC

(57) ABSTRACT

One embodiment of an exhaust system support assembly formed in accordance with the present disclosure includes a wishbone link (10) that couples an exhaust member (26) to a vehicle (56) The wishbone link includes a leg (12) branching into a first arm (14) and a second arm (16) A first pivot assembly (20) pivotally couples the first arm (14) to the exhaust member (26), and a second pivot assembly (22) pivotally couples the second arm (16) to the exhaust member (26) A third pivot assembly (24) pivotally couples the leg (12) to the vehicle (56) so that the wishbone link (10) is movable in two or more degrees of freedom relative to the vehicle (56).

29 Claims, 6 Drawing Sheets

RETENTION LINKAGE FOR VEHICLE EXHAUST SYSTEMS

TECHNICAL FIELD

The present application relates generally to a support device for vehicle exhaust systems, and more specifically to a retention linkage for coupling a vertical exhaust system to a vehicle.

BACKGROUND

Semi-trailer trucks typically include at least one vertical exhaust stack positioned rear of the truck cab or alongside the truck cab. The vertical exhaust stack is normally secured to the truck by an exhaust system support assembly, which secures the exhaust pipe of the exhaust stack to the surface of the truck cab. Other portions of the exhaust system are attached to the frame of the vehicle. Because the truck cab is moveably suspended upon the frame of the vehicle, when the semi-trailer truck is in motion, there is necessarily movement between the exhaust stack and the cab. An inefficient exhaust system support assembly results in the motion of the cab being restricted at the extreme positions of cab movement during jounce and rebound. This restriction can cause the exhaust system support assembly to be torn away from the truck cab when the truck cab moves independently of the exhaust stack. Moreover, when the vibration from the truck cab transmits directly to the exhaust stack connection, the connection can loosen and fail over time.

Operators of semi-trailer trucks would find desirable an exhaust system support assembly that allows for a sufficient range of motion between the truck cab and exhaust system, that reduces vibration and noise generated by the moving components of the assembly, and that is durable and long-lasting.

SUMMARY

An exhaust system support assembly formed in accordance with the present disclosure secures a vertical exhaust stack to a truck cab while providing an adequate range of motion, reduced vibration and noise, and is durable and long lasting.

In one embodiment, an exhaust system support assembly formed in accordance with the present disclosure includes a wishbone link that couples an exhaust member to a vehicle. The wishbone link includes a leg branching into a first arm and a second arm with a first pivot assembly pivotally coupling the first arm to the exhaust member, and a second pivot assembly pivotally coupling the second arm to the exhaust member. A third pivot assembly pivotally couples the leg to the vehicle so that the wishbone link is movable in two or more degrees of freedom relative to the vehicle.

BRIEF DESCRIPTION OF THE DRAWINGS

The foregoing aspects and many of the attendant advantages of this application will become more readily appreciated as the same become better understood by reference to the following detailed description, when taken in conjunction with the accompanying drawings, wherein.

DETAILED DESCRIPTION OF A PREFERRED EMBODIMENT

Figure 1:
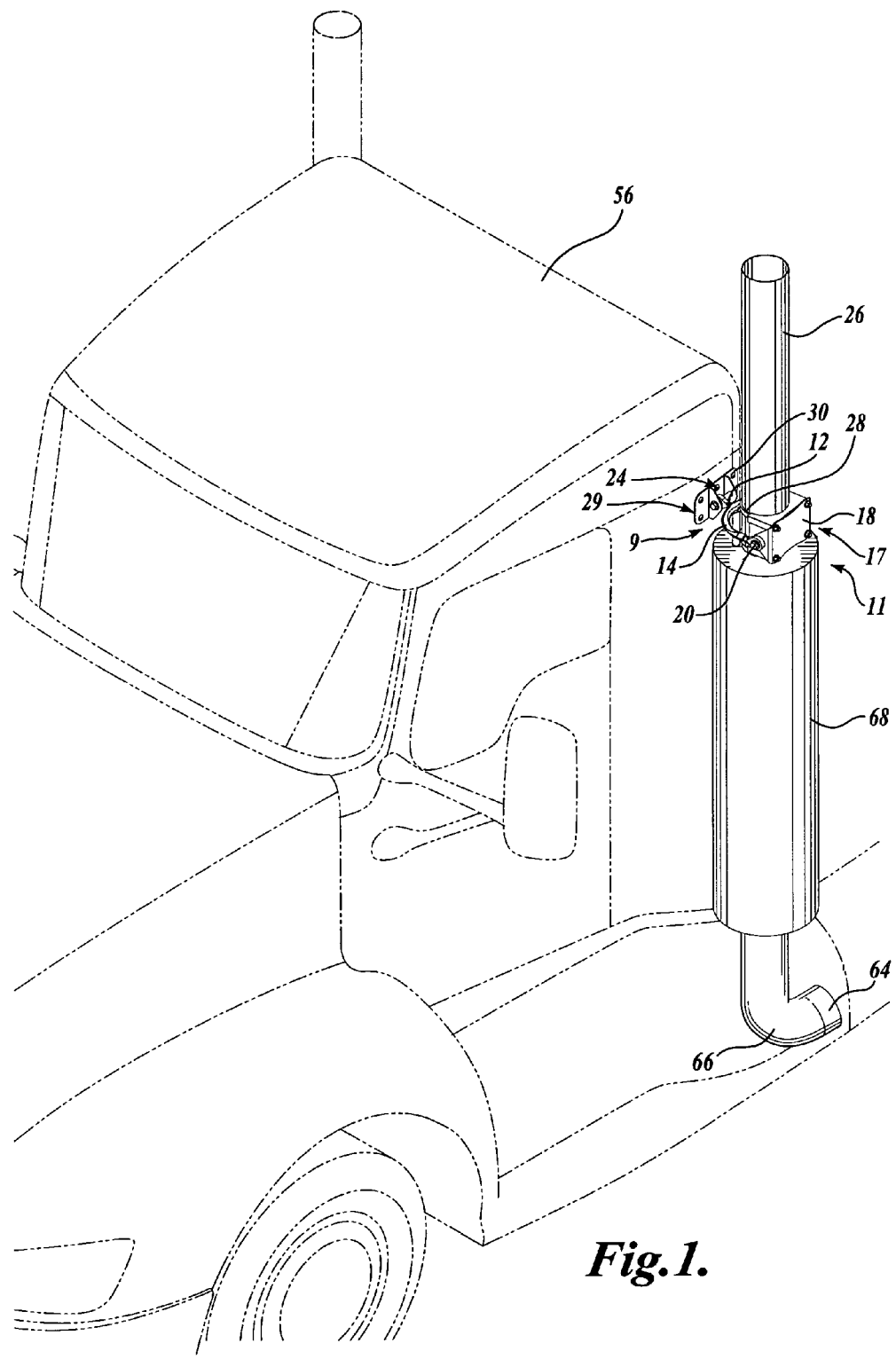
FIG. 1 is an isometric view of a vertical exhaust assembly coupled to a truck cab.

Referring to FIGS. 1-7, a preferred embodiment of an exhaust system support assembly for vertical exhaust systems 11 is depicted as a three-point retention linkage 9. As shown in FIG. 1, a cab of a motor vehicle, and specifically a truck cab 56 of a semi-trailer truck is positioned above and coupled to a frame (not shown) of a truck.

Vertical exhaust system 11 includes an engine exhaust pipe 64 positioned below the truck cab 56. Engine exhaust pipe 64 is positioned above and coupled to the truck frame. One end of engine exhaust pipe 64 is coupled to one end of engine exhaust pipe elbow 66. A vertically oriented muffler 68 is positioned above and coupled to the other end of engine exhaust pipe elbow 66. An exhaust stack 26, which is a cylindrical outlet port for gases exiting muffler 68, is positioned above and coupled to the end of muffler 68 opposite elbow 66. Exhaust muffler 68 and exhaust stack 26 may be positioned in a vertical orientation rear of truck cab 56 or alongside truck cab 56. For ease of illustration and clarity, only exhaust muffler 68 and stack 26 positioned vertically and alongside truck cab 56 will be described, but it should be appreciated that three-point retention linkage 9 will similarly work for a vertical exhaust system positioned rear of truck cab 56.

Figure 2:
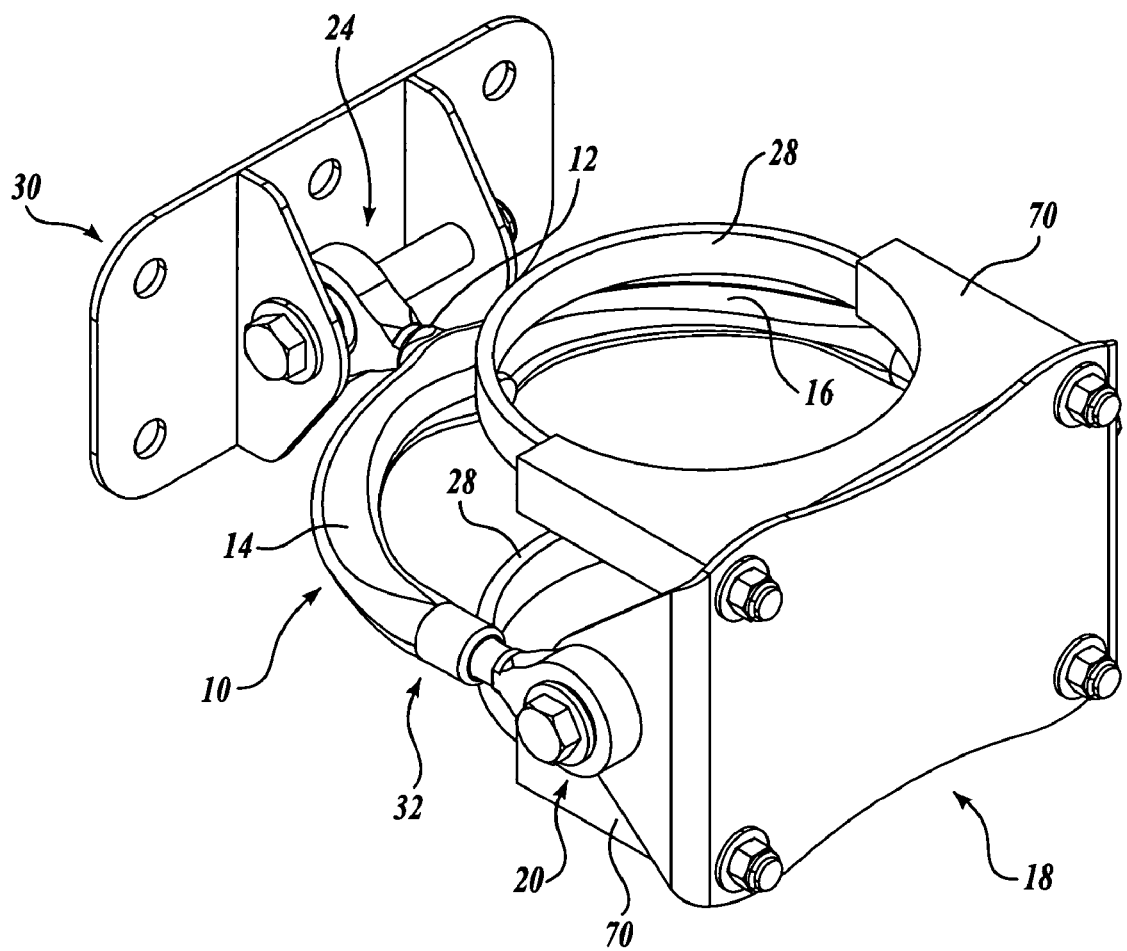
FIG. 2 is an isometric view of a retention linkage for a vehicle exhaust system.
Figure 3:
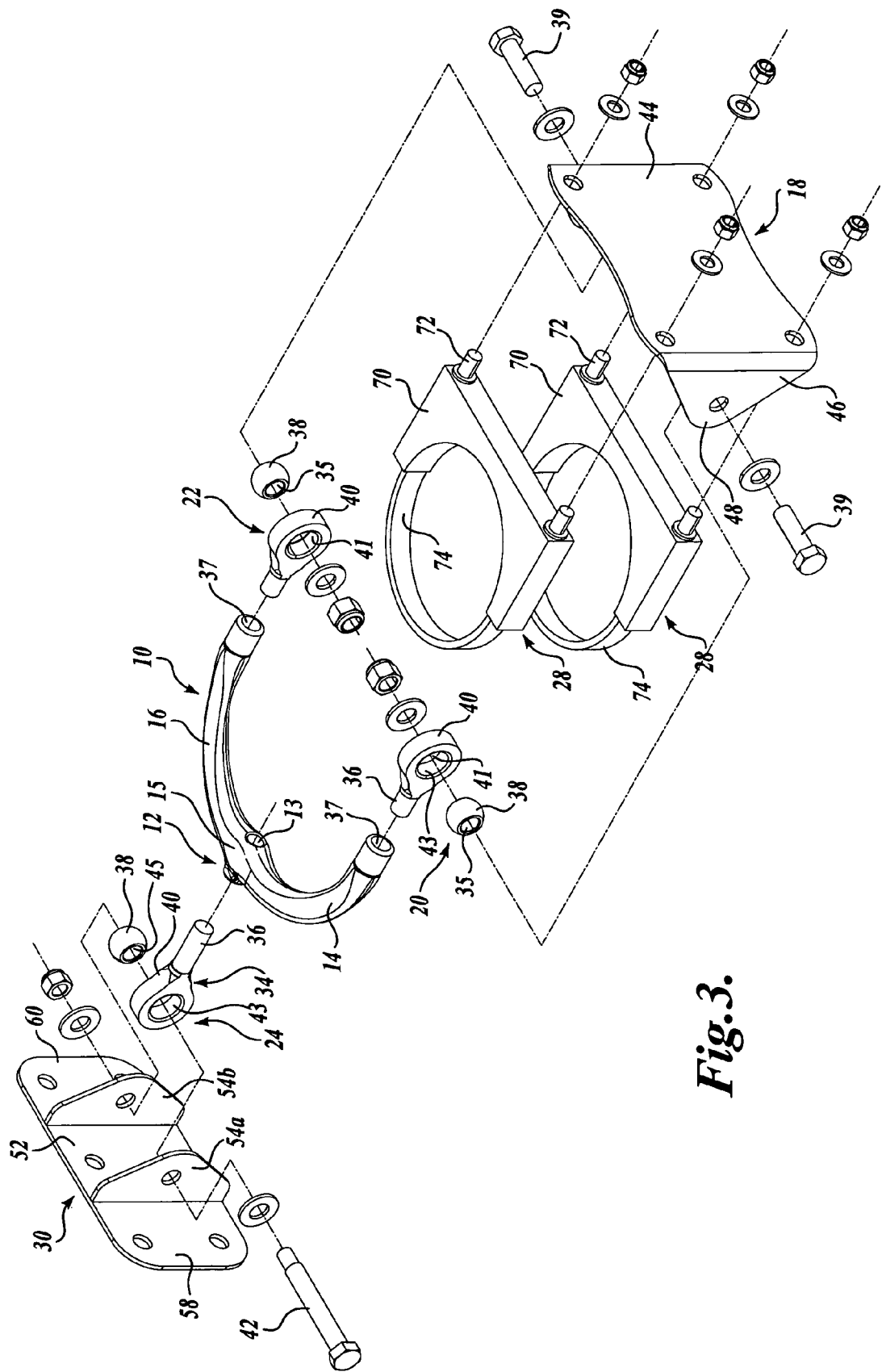
FIG. 3 is an exploded view of the retention linkage of FIG. 2.

Exhaust stack 26 is coupled to the truck cab 56 using three-point retention linkage 9 as described below. Referring to FIGS. 1-3, linkage 9 includes a wishbone link 10 having a leg 12 and first and second arms 14 and 16. The wishbone link 10 is coupled to the truck cab 56 with a vehicle mounting assembly 29, and the wishbone link 10 is coupled to the exhaust stack 26 with an exhaust member mounting assembly 17. The first arm 14 and second arm 16 are coupled to the exhaust member mounting assembly 17 via first and second heim joints 20 and 22. The leg 12 of the wishbone link 10 is coupled to the vehicle mounting assembly 29 via a third heim joint 24. For ease of illustration and clarity, the three-point retention linkage 9 is shown in a substantially horizontal orientation mounted to a vertical exhaust stack 26, although it may be suitably used in any orientation, such as vertical. Therefore, the terminology "front," "rear", "upper," "lower", etc. should be construed as descriptive and not limiting.

Now referring specifically to FIG. 2, the wishbone link 10 includes a leg 12 and first and second arms 14 and 16. One end of the leg 12 branches into first and second arms 14 and 16 to form a wishbone shape. The first and second arms 14 and 16 may be any cross-sectional shape, such as round, triangular, rectangular, or other polygonal shape. The first and second arms 14 and 16 are preferably made of steel or aluminum, but other materials of sufficient strength and durability may also be used. The first and second arms 14 and 16 extend fore and aft outwardly from the leg 12 and are shaped in a manner to cooperatively form a U-shaped portion 32 of the wishbone link 10. The U-shaped portion 32 of the wishbone link 10 partially surrounds the exhaust stack 26 when the wishbone link 10 is mounted to the exhaust member mounting bracket 18, as later described. However, the U-shaped portion 32 of the wishbone link 10 does not engage the exhaust stack 26; rather, a gap is defined therebetween.

Referring to FIGS. 2 and 3, ends of the first and second arms 14 and 16 opposite leg 12 are pivotally connected to an exhaust member mounting bracket 18 of the exhaust member mounting assembly 17 by the use of first and second pivot assemblies, e.g., first and second heim joints 20 and 22. The first and second heim joints 20 and 22 are preferably made of steel or aluminum, but other materials of sufficient strength and durability may also be appreciated. The first and second heim joints 20 and 22 include a threaded shaft 36. The ends of first and second arms 14 and 16 opposite leg 12 each include threaded openings 37 into which one end of the threaded shaft 36 may be threadably received. The opposing end of threaded shaft 36 includes an enlarged circular head 40 with a head circular opening 41 passing through head 40 defining a bearing surface 43. The head circular opening 41 receives a spherical bearing 38. The spherical bearing 38 includes a cylindrical opening 35 through which a bolt or rod 39 may pass. It can be appreciated by one skilled in the art that other bearing styles may be employed with the first and second heim joints 20 and 22. For example, the circular head 40 may instead receive two flanged cylindrical bearings through which a bolt or rod 39 may pass.

The cylindrical opening 35 is non-threaded to receive a partially non-threaded bolt 39. The bolt 39 passes through the spherical bearing 38 and thereafter through an opening in the exhaust member mounting bracket 18 to secure the arms 14 and 16 to the exhaust member mounting bracket 18 as described in more detail below. The bolt 39 includes a threaded end portion for receiving a nut. The bolt 39 is passed through the spherical bearing 38 so that the non-threaded portion of the bolt 39 is positioned within the cylindrical opening 35, and the threaded portion of the bolt 39 passes through the exhaust member mounting bracket 18. After passing through the exhaust member mounting bracket 18, the threaded end portion of bolt 39 receives a washer and nut to secure the spherical bearing 38 and circular head 40 to the exhaust member mounting bracket 18.

It can be appreciated that heim joints 20 and 22 may instead be coupled to the exhaust member mounting bracket 18 by passing a fully-threaded bolt through each spherical bearing 38 to receive a washer and nut. Alternatively, rods may be coupled to the lateral projecting portions 46 of the exhaust member mounting bracket 18 such that the rods may be received within the spherical bearings 38, and a clip or other fastener may thereafter be secured on the rod end. Both alternatives may use a spherical bearing, a cylindrical bearing, or another suitable bearing.

The partially threaded bolt 39 is rotatably secured within the spherical bearing 38 so that the enlarged circular head 40 may rotate about the spherical bearing 38, and the spherical bearing 38 may rotate about the bolt 39. Thus, the heim joints 20 and 22 allow the arms 14 and 16 to rotate about the longitudinal axis passing through the center of rods 39. However, for ease of illustration and clarity, the rotational movement of the circular head 40 will hereinafter be illustrated as the circular head 40 rotating about the spherical bearing 38 without the spherical bearing 38 also rotating about the bolt 39. In the alternative, a longer partially non-threaded bolt 39 and/or a narrower exhaust member mounting bracket 18 and/or a wishbone link 10 with a wider U-shaped portion 32 may be used so that the bolt 39 is slidably coupled within the spherical bearing 38. In this manner, the spherical bearing 38 slides along the bolt 39, and the bolt 39 slides within the spherical bearing 38. Thus, the enlarged circular head 40 rotates about the spherical bearing 38 while also being slidably translated along the bolt 39 through the spherical bearing 38. In this alternative embodiment, the heim joints 20 and 22 allow the arms 14 and 16 to rotate about the longitudinal axis passing through the center of rods 39, and they also allow the arms 14 and 16 to slide horizontally along the longitudinal axis passing through the center of rods 39. In this alternative configuration, the third heim joint 24 may be restricted in horizontal movement without compromising the movement of the wishbone link 10. For instance, the third heim joint 24 may be restricted by disposing spacers between the third heim joint 24 and the orthogonal plates 54a and 54b or by positioning the orthogonal plates 54a and 54b closer to one another on the vehicle mounting bracket 30.

The leg 12 includes an enlarged portion 15 of the wishbone link 10 with threaded receiving hole 13. The center axis of hole 13 extends in the same general direction as the axis of openings 37. The receiving hole 13 may receive the threaded shaft 36 of a third heim joint 24 so that the enlarged portion 15 and threaded shaft 36 cooperatively form leg 12. In an alternate embodiment, the receiving hole 13 may receive an extension shaft (not shown), wherein the extension shaft is coupled to the threaded shaft 36 of the third heim joint 24. The extension shaft may be used to modify the size of the wishbone link 10 to fit between any truck cab/vertical exhaust system assemblies. In yet another embodiment, the threaded shaft 36 or extension shaft may be formed as an integral part of the wishbone link 10.

Continuing to refer to FIGS. 2 and 3, leg 12 is pivotally connected to a vehicle mounting bracket 30 of the vehicle mounting assembly 29 (described below in more detail with reference to FIG. 4) via a third pivot assembly, e.g., third heim joint 24. The third heim joint 24 includes a heim body 34 with a threaded shaft 36, wherein the threaded shaft 36 is threadably received into the receiving hole 13 of the wishbone link 10. Third heim joint 24 further includes an enlarged circular head 40 with a head circular opening 41 defining a bearing surface 43. A spherical bearing 38 is embedded in the head circular opening 41. The spherical bearing 38 includes a non-threaded cylindrical opening 45 through which a partially non-threaded bolt 42 may pass. The non-threaded portion of bolt 42 is slidably and rotatably received within the spherical bearing 38. In this regard, the spherical bearing 38 may slide along the bolt 42 and the bolt 42 may slide within the spherical bearing 38. Moreover, the spherical bearing 38 may rotate about the bolt 42 and the bolt 42 may rotate within the spherical bearing 38. Therefore, the circular head 40 may rotate about the spherical bearing 38 while also being slidably translated along the rod 42 through the spherical bearing 38. For ease of illustration and clarity in describing the rotational movement of the third heim joint 24, only the rotation of the circular head 40 about the spherical bearing 38 will be hereinafter described, even though the spherical bearing 38 is also capable of rotating about the bolt 42. Thus, the wishbone link 10 is moveable in two or more degrees of freedom with respect to the truck cab 56. More specifically, the third heim joint 24 allows the leg 12 to rotate about the longitudinal axis of rod 42, to slide horizontally along the longitudinal axis of rod 42, and to move with the enlarged circular head 40 about the spherical bearing 38.

The bolt 42 includes a threaded end portion that is adapted to receive a nut. The threaded portion of bolt 42 passes through the spherical bearing 38 and thereafter through an opening in the vehicle mounting bracket 30 to receive the nut. The bolt 42 therefore secures the leg 12 to the vehicle mounting bracket 30. The third heim joint 24, however, allows the leg 12 to move in two or more degrees of freedom with respect to the vehicle mounting bracket 30. The third heim joint 24 is preferably made of steel or aluminum, but other materials of sufficient strength and durability may also be appreciated.

The wishbone link 10 is pivotally connected to the tractor cab 56 through the vehicle mounting assembly 29, which includes a vehicle mounting bracket 30. The vehicle mounting bracket 30 is preferably made of steel or aluminum, but other materials of sufficient strength and durability may also be appreciated. The vehicle mounting bracket 30 includes a mounting plate 52 and orthogonal plates 54a and 54b extending from mounting plate 52. The orthogonal plates 54a and 54b are coupled to the mounting plate 52 so that a portion of the mounting plate 52 extends laterally of the orthogonal plates 54a and 54b to form first and second lateral edge portions 58 and 60. The orthogonal plates 54a and 54b are preferably triangular-shaped; however, it can be appreciated that the orthogonal plates 54a and 54b may instead take the form of another polygonal shape, such as a rectangle.

Figure 4:
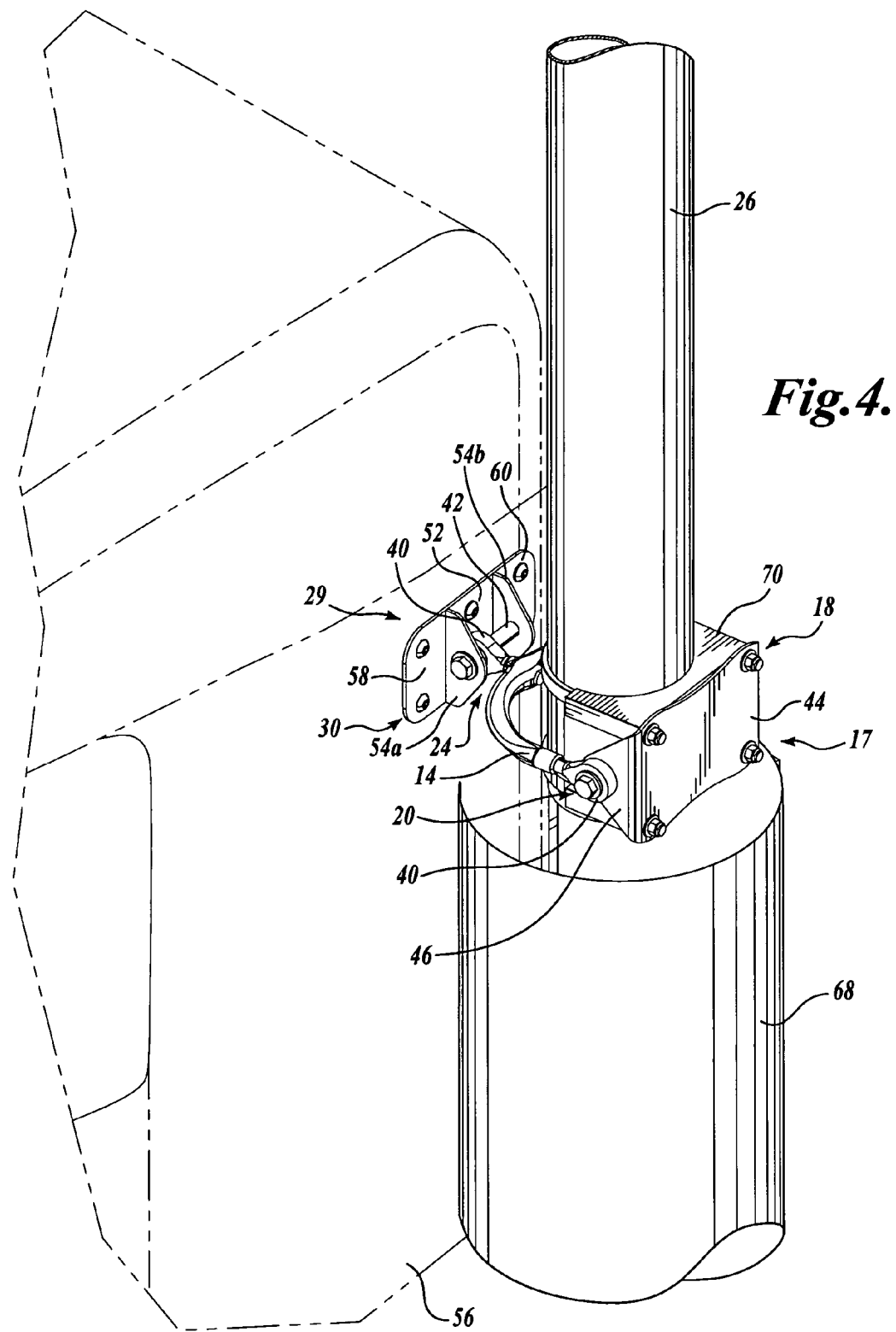
FIG. 4 is an enlarged isometric view of an exhaust stack coupled to a truck cab with the retention linkage of FIG. 2.

Referring to FIG. 4, the vehicle mounting bracket 30 is mounted to the side of the truck cab 56 such that the orthogonal plates 54a and 54b extend outwardly toward the exhaust stack 26. The vehicle mounting bracket 30 is coupled to the side of the truck cab 56 with fasteners such as screws, bolts, nails, etc. passing through the mounting plate 52 and first and second lateral edge portions 58 and 60. It can be appreciated that the vehicle mounting bracket 30 can be mounted to the side of the truck cab 56 by alternate means, such as rivets, glue, etc.

Referring back to FIG. 3, the leg 12 is pivotally connected to the vehicle mounting bracket 30 by the use of the third heim joint 24. The third heim joint 24 extends from the leg 12 so that the enlarged circular head 40 is disposed between the orthogonal plates 54a and 54b. The bolt 42 of the third heim joint 24 therefore passes through an opening in the first orthogonal plate 54a, the enlarged circular head 40 of the third heim joint 24, and an opening in the second orthogonal plate 54b. The threaded end portion of the bolt 42 is secured by a nut. However it can be appreciated that the third heim joint 24 may be secured between the first and second orthogonal plates 54a and 54b with other suitable methods, such as by passing a non-threaded shaft through the spherical bearing 38 and first and second orthogonal plates 54a and 54b and thereafter securing the shaft ends with two retainer clips.

Referring to FIGS. 3 and 4, the wishbone link 10 is pivotally connected to the exhaust stack 26 through an exhaust member mounting assembly 17 having an exhaust member mounting bracket 18. The exhaust member mounting bracket 18 is preferably made of steel or aluminum, but other materials of sufficient strength and durability may also be appreciated. The exhaust member mounting bracket 18 is preferably U-shaped in cross-section, such that the exhaust member mounting bracket 18 includes a mounting portion 44 and lateral projecting portions 46. The lateral projecting portions 46 are preferably triangular-shaped to form an exhaust member mounting bracket 18 with a pivotal mounting portion 48. However, it can be appreciated that the lateral projecting portions 46 may instead take the form of another polygonal shape, such as a rectangle.

The lateral projecting portions 46 are preferably formed on the exhaust member mounting bracket 18 by bending the lateral edges of the mounting portion 44 generally 90 degrees. Thus, the lateral projecting portions 46 are generally formed orthogonal to the mounting portion 44. Moreover, the mounting portion 44 and lateral projecting portions 46 are preferably formed from one piece of sheet metal. However, it can be appreciated that the exhaust member mounting bracket 18 may be formed from more than one piece of material, wherein the mounting portion 44 and lateral projecting portions 46 are mated together to cooperatively form the exhaust member mounting bracket 18.

Referring to FIG. 4, the exhaust member mounting bracket 18 is positioned outwardly of the exhaust stack 26 so exhaust stack 26 is located between vehicle mounting bracket 30 and exhaust member mounting bracket 18. In this arrangement, lateral projecting portions 46 project inwardly towards the tractor cab 56 to the fore and aft of the exhaust stack 26. The first and second arms 14 and 16 of the wishbone link 10 extend around a portion of the exhaust stack 26 to be pivotally coupled to the lateral projecting portions 46 via the first and second heim joints 20 and 22.

Referring back to FIG. 3, an exhaust stack mounting assembly 28 for coupling the exhaust member mounting bracket 18 to the exhaust stack 26 includes a receiving bracket 70 and a U-bolt 74. Preferably, two exhaust stack mounting assemblies 28 are used to couple the exhaust member mounting bracket 18 to the exhaust stack 26. The receiving bracket 70 is generally rectangular with a semicircular recess formed along one of its elongated edges. Two thru-holes (not shown) adjacent to the semicircular recess pass from one elongated edge of the receiving bracket 70 to the other elongated edge. To couple the exhaust member mounting bracket 18 to the exhaust stack 26, the semicircular recess of the receiving bracket 70 engages the exhaust stack 26. Thereafter, the U-bolt 74 engages the opposite side of the exhaust stack 26 to enclose the exhaust stack 26 between the U-bolt 74 and the receiving bracket 70, and the ends of the U-bolt 74 are received into the two thru-holes of the receiving bracket 70. The U-bolt 74 includes threaded portions 72 at both ends, which protrude out of the thru-holes of the receiving bracket 70. The threaded portions 72 of the U-bolt 74 are received into apertures formed in the exhaust member mounting bracket 18. A washer and nut are thereafter secured to the end of the threaded projections 72 to couple the exhaust member mounting bracket 18 to the exhaust stack 26.

As described with respect to FIG. 1, the exhaust stack 26 is coupled to the truck frame through the engine exhaust pipe 64, and it is coupled to the truck cab 56 through the three-point retention linkage 9. Because cab 56 is moveably suspended upon the frame of the vehicle, when the semi-trailer truck is in motion the exhaust stack 26 and the cab 56 necessarily move independently. The three-point retention linkage 9 allows the exhaust stack 26 to be coupled to the cab 56 without substantially restricting the motion of the cab 56 relative to the truck frame as described below in more detail.

Figure 5:
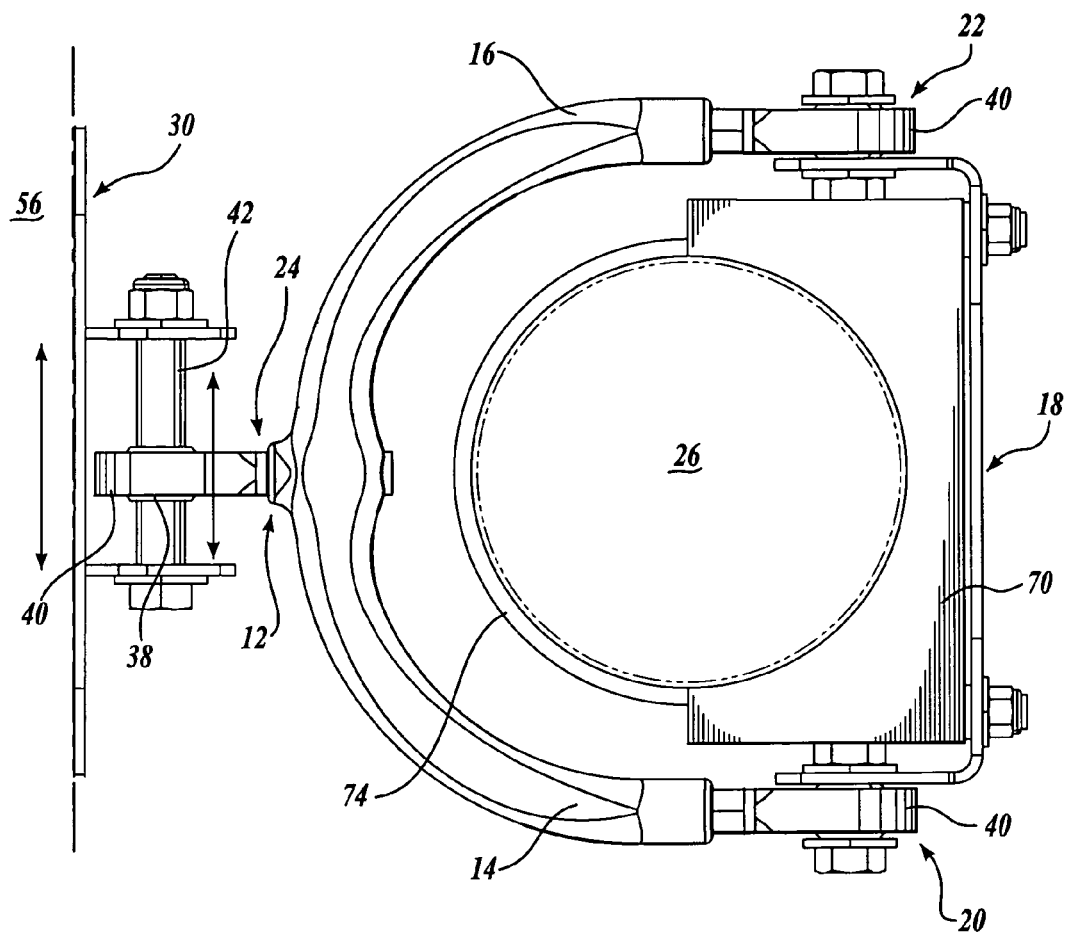
FIG. 5 is a top view of the retention linkage of FIG. 2.

Referring to FIG. 5, the third heim joint 24 allows the exhaust stack 26 and cab 56 to move independently. When the cab 56 is translated horizontally and the exhaust stack 26 remains stationary, the vehicle mounting bracket 30 also translates horizontally, causing the bolt 42 to slidably translate within the spherical bearing 38 of the third heim joint 24. If the exhaust stack 26 remains stationary, then exhaust member mounting bracket 18 and the wishbone link 10 remain stationary. Thus, the leg 12, enlarged circular head 40 of the third heim joint 24, and spherical bearing 38 of the third heim joint 24 also remain stationary while the bolt 39 slides within the spherical bearing 38. As a result, the wishbone link 10 and exhaust stack 26 may maintain their horizontal position while the cab 56 moves horizontally. If the exhaust stack 26 is translated horizontally and the truck cab 56 remains stationary, the exhaust member mounting bracket 18 and wishbone 10 may move horizontally through horizontal movement of the enlarged circular head 40 of the third heim joint 24 and the spherical bearing 38 of the third heim joint 24 along bolt 42.

Figure 6:
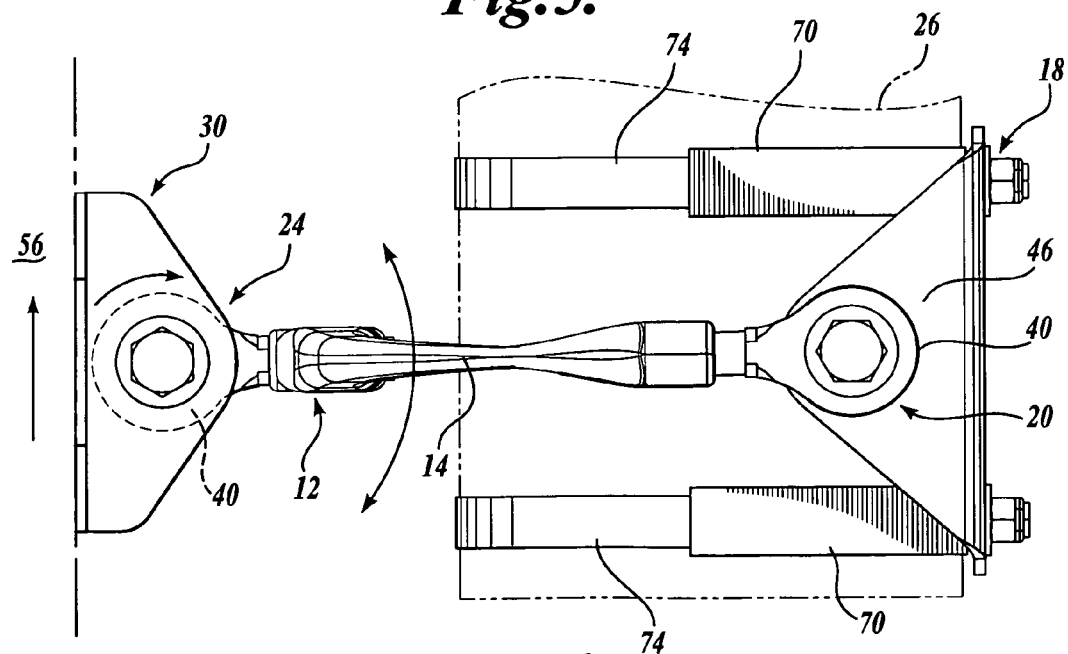
FIG. 6 is a side view of the retention linkage of FIG. 2.

Now referring to FIG. 6, when the cab 56 or exhaust stack 26 are translated vertically relative to each other, the heads 40 of the heim joints 20, 22 (not shown), and 24 may rotate about the spherical bearing 38 to adjust the position of the wishbone link 10. If the cab 56 is translated upward and the exhaust stack 26 maintains its vertical position, the wishbone link 10 pivots about the heim joints 20, 22, and 24 to raise the leg 12. The circular head 40 of the third heim joint 24 rotates clockwise about the spherical bearing 38 to raise the leg 12. In addition, the circular head 40 of the first and second heim joints 20 and 22 rotate clockwise about the spherical bearing 38 to raise the arms 14 and 16 with the leg 12. Thus, the leg 12 of the wishbone link 10 travels upward with the cab 56. Similarly, if the exhaust stack 26 is translated upward and the cab 56 maintains its vertical position, the wishbone link 10 may pivot about the heim joints 20, 22, and 24 to raise the arms 14 and 16 with the exhaust stack 26. The circular head 40 of the first and second heim joints 20 and 22 may rotate counterclockwise about the spherical bearing 38 to raise the first and second arms 14 and 16 to travel upward with the exhaust stack 26. Likewise, the circular head 40 of the third heim joint 24 rotates counterclockwise about the spherical bearing 38 to raise the leg 12 with the arms 14 and 16. If both the exhaust stack 26 and cab 56 translate vertically, the circular head 40 of the heim joints 20, 22, and 24 will rotate about the spherical bearings 38 to adjust the position of the wishbone link 10 as needed.

Figure 7:
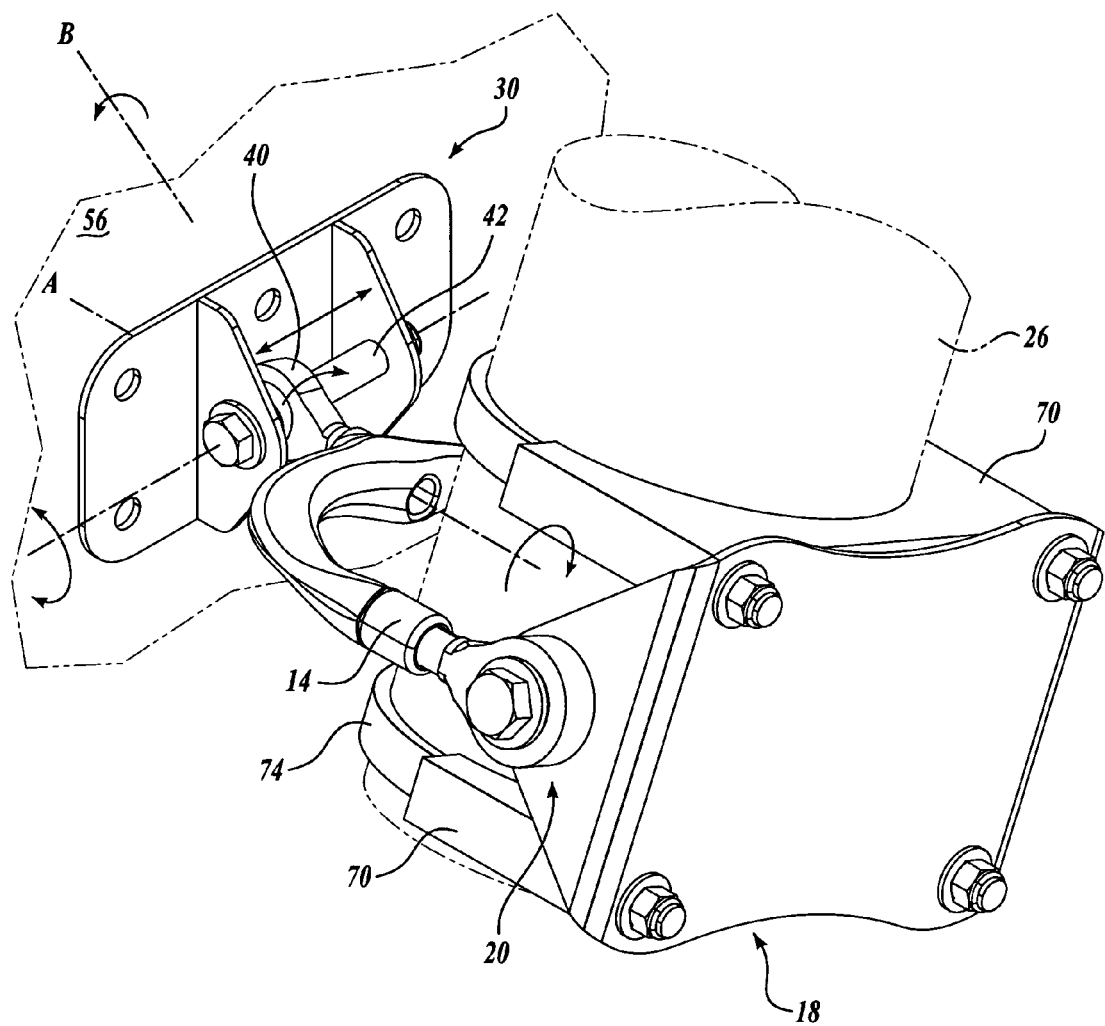
FIG. 7 is an isometric view of an exhaust stack coupled to a truck cab with the retention linkage of FIG. 2, wherein at least a portion of the retention linkage has been rotated clockwise.

Referring additionally to FIG. 7, the wishbone link 10 pivots about the third heim joint 24 in response to the rotational motion of the exhaust stack 26 and/or the truck cab 56 relative to each other. When the exhaust stack 26 rotates clockwise about axis A (wherein axis A passes through the center of the receiving hole 13) and the truck cab 56 remains relatively stationary, the exhaust member mounting bracket 18 also rotates clockwise, causing the wishbone link 10 to rotate clockwise. The leg 12 and the circular head 40 of the third heim joint 24 are also translated clockwise through the wishbone link 10. The circular head 40 of the third heim joint 24 rotates clockwise about the spherical bearing 38. Since the truck cab 56 remains stationary, the vehicle mounting plate 30 and bolt 42 also remain stationary. Thus, the spherical bearing 38 remains relatively stationary with the bolt 42, and the circular head 40 of the third heim joint 24 pivots about that spherical bearing 38. Thus, the third heim joint 24 allows the wishbone link 10 to rotate with the exhaust stack 26 while maintaining its connection to the truck cab 56, even if the truck cab 56 does not rotate or rotates in the opposite direction.

Likewise, when the truck cab 56 rotates about its center longitudinal axis B, the wishbone link 10 may pivot about the third heim joint 24 to maintain its rotational position in alignment with the exhaust stack 26. If the truck cab 56 rotates about axis B in the counterclockwise direction, the vehicle mounting plate 30 and bolt 42 also rotate counterclockwise. The bolt 42 causes the spherical bearing 38 to rotate counterclockwise. The circular head 40 of the third heim joint 24 is held in a substantially stationary position by the leg 12 of the wishbone link 10 since the wishbone link 10 is coupled to the stationary exhaust stack 26. Therefore, the spherical bearing 38 rotates counterclockwise within the circular head 40, allowing the bolt 42, vehicle mounting plate 30 and truck cab 56 to rotate counterclockwise. Thus, the wishbone link 10 pivots about the third heim joint 24 to maintain the same rotational position as the exhaust stack 26.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An exhaust system support assembly for coupling an exhaust member to a vehicle comprising:
    (a) a wishbone link having a leg branching into a first arm and a second arm;
    (b) a first pivot assembly for pivotally coupling the first arm to the exhaust member;
    (c) a second pivot assembly for pivotally coupling the second arm to the exhaust member; and
    (d) a third pivot assembly for pivotally coupling the leg to the vehicle so that the wishbone link is movable in two or more degrees of freedom relative to the vehicle.

2. The exhaust system support assembly of claim 1, wherein the first pivot assembly is a heim joint.

3. The exhaust system support assembly of claim 1, wherein the second pivot assembly is a heim joint.

4. The exhaust system support assembly of claim 1, wherein the third pivot assembly is a heim joint.

5. The exhaust system support assembly of claim 1 further comprising a vehicle mounting assembly for coupling the exhaust system support assembly to the vehicle, the vehicle mounting assembly comprising:
    a vehicle mounting bracket couplable to the exhaust system support assembly via the third pivot assembly; and
    means for mounting the bracket to the vehicle.

6. The exhaust system support assembly of claim 5, wherein the third pivot assembly of the exhaust system support assembly pivotally couples the exhaust system support assembly leg to the vehicle mounting bracket so that the wishbone link is movable in two or more degrees of freedom relative to the vehicle.

7. The exhaust system support assembly of claim 1 further comprising:
    an exhaust member mounting bracket couplable to the first and second pivot assemblies; and
    at least one exhaust member mounting assembly for coupling the exhaust member mounting bracket to the exhaust member.

8. The exhaust system support assembly of claim 7, the exhaust member mounting assembly further comprising a receiving bracket and a U-bolt that enclose the exhaust member therebetween.

9. An exhaust system support assembly for coupling an exhaust member to a vehicle comprising:
    (a) a wishbone link having a leg branching into a first arm and a second arm;
    (b) a first heim joint for pivotally coupling the first arm to the exhaust member;
    (c) a second heim joint for pivotally coupling the second arm to the exhaust member; and
    (d) a third heim joint for pivotally coupling the leg to the vehicle so that the wishbone link is movable in two or more degrees of freedom relative to the vehicle.

10. The exhaust system support assembly of claim 9 further comprising a vehicle mounting assembly for coupling the exhaust system support assembly to the vehicle, the vehicle mounting assembly comprising:
    a vehicle mounting bracket couplable to the exhaust system support assembly via the third heim joint; and
    means for mounting the bracket to the vehicle.

11. The exhaust system support assembly of claim 10, wherein the third heim joint of the exhaust system support assembly pivotally couples the exhaust system support assembly leg to the vehicle mounting bracket so that the wishbone link is movable in two or more degrees of freedom relative to the vehicle.

12. The exhaust system support assembly of claim 9 further comprising:
- an exhaust member mounting bracket couplable to the first and second pivot assemblies; and
- at least one exhaust member mounting assembly for coupling the exhaust member mounting bracket to the exhaust member.

13. The exhaust system support assembly of claim 12, the exhaust member mounting assembly further comprising a receiving bracket and a U-bolt that enclose the exhaust member therebetween.

14. A method for coupling an exhaust member to a vehicle, the method comprising:
- (a) providing a wishbone link having a leg branching into a first arm and a second arm;
- (b) pivotally coupling the first arm to the exhaust member with a first pivot assembly;
- (c) pivotally coupling the second arm to the exhaust member with a second pivot assembly; and
- (d) pivotally coupling the leg to the vehicle with a third pivot assembly so that the wishbone link is movable in two or more degrees of freedom relative to the vehicle.

15. The method of claim 14, wherein the first pivot assembly is a heim joint.

16. The method of claim 14, wherein the second pivot assembly is a heim joint.

17. The method of claim 14, wherein the third pivot assembly is a heim joint.

18. The method of claim 14, further comprising providing a vehicle mounting assembly for coupling the exhaust system support assembly to the vehicle, the vehicle mounting assembly comprising:
- a vehicle mounting bracket couplable to the exhaust system support assembly via the third pivot assembly; and
- means for mounting the bracket to the vehicle.

19. The method of claim 18, wherein the third pivot assembly of the exhaust system support assembly pivotally couples the exhaust system support assembly leg to the vehicle mounting bracket so that the wishbone link is movable in two or more degrees of freedom relative to the vehicle.

20. The method of claim 19 further comprising:
- providing an exhaust member mounting bracket couplable to the first and second pivot assemblies; and
- providing at least one exhaust member mounting assembly for coupling the exhaust member mounting bracket to the exhaust member.

21. The method of claim 20, wherein the exhaust member mounting assembly includes a receiving bracket and a U-bolt that enclose the exhaust member therebetween.

22. An exhaust system support assembly for coupling an exhaust member to a vehicle comprising:
- (a) a wishbone link having a leg branching into a first arm and a second arm;
- (b) means for pivotally coupling the first arm to the exhaust member;
- (c) means for pivotally coupling the second arm to the exhaust member; and
- (d) means for pivotally coupling the leg to the vehicle so that the wishbone link is movable in two or more degrees of freedom relative to the vehicle.

23. The exhaust system support assembly of claim 22, wherein the first pivot assembly is a heim joint.

24. The exhaust system support assembly of claim 22, wherein the second pivot assembly is a heim joint.

25. The exhaust system support assembly of claim 22, wherein the third pivot assembly is a heim joint.

26. The exhaust system support assembly of claim 22 further comprising a vehicle mounting assembly for coupling the exhaust system support assembly to the vehicle, the vehicle mounting assembly comprising:
- a vehicle mounting bracket couplable to the exhaust system support assembly via the third pivot assembly; and
- means for mounting the bracket to the vehicle.

27. The exhaust system support assembly of claim 22, wherein the third pivot assembly of the exhaust system support assembly pivotally couples the exhaust system support assembly leg to the vehicle mounting bracket so that the wishbone link is movable in two or more degrees of freedom relative to the vehicle.

28. The exhaust system support assembly of claim 22, further comprising an exhaust member mounting assembly for coupling the exhaust system support assembly to the exhaust member, the exhaust member mounting assembly comprising:
- an exhaust member mounting bracket couplable to the first and second pivot assemblies; and
- at least one exhaust member mounting assembly for coupling the exhaust member mounting bracket to the exhaust member.

29. The exhaust system support assembly of claim 28, the exhaust member mounting assembly further comprising a receiving bracket and a U-bolt that enclose the exhaust member therebetween.

* * * * *